US005379455A

United States Patent [19]

Koschek

[11] Patent Number: 5,379,455

[45] Date of Patent: Jan. 3, 1995

[54] MODULAR DISTRIBUTED ANTENNA SYSTEM

[75] Inventor: Drew G. Koschek, Ashland, Mass.

[73] Assignee: Hewlett-Packard Company, Palo Alto, Calif.

[21] Appl. No.: 60,499

[22] Filed: May 10, 1993

Related U.S. Application Data

[63] Continuation of Ser. No. 662,278, Feb. 28, 1991, abandoned.

[51] Int. Cl.$^{6}$ .......................... H04B 7/08; H04B 3/50

[52] U.S. Cl. .................................... 455/273; 455/282; 455/293; 343/858

[58] Field of Search ..................... 455/3.1, 6.1, 14, 16, 455/55.1, 272, 273, 278.1, 280, 281, 282, 291, 293; 333/28 R, 100; 343/850, 853, 858

[56] References Cited

U.S. PATENT DOCUMENTS

| | | | |
|---|---|---|---|
| 3,258,774 | 6/1966 | Kinsey | 343/854 |
| 3,435,453 | 3/1969 | Howard | 343/100 |
| 3,680,100 | 7/1972 | Woerrlein | 343/11 R |
| 3,750,020 | 7/1973 | Baba et al. | 455/55.1 |
| 3,876,947 | 4/1975 | Giraudon | 325/367 |
| 4,228,436 | 10/1980 | DuFort | 343/854 |
| 4,228,544 | 10/1980 | Guyton | 455/282 |
| 4,480,255 | 10/1984 | Davidson | 343/844 |
| 4,500,883 | 2/1985 | Gutleber | 343/383 |
| 4,686,533 | 8/1987 | MacDonald et al. | 342/373 |
| 4,872,016 | 10/1989 | Kress | 342/380 |
| 4,876,548 | 10/1989 | Lopez | 342/368 |
| 4,916,460 | 4/1990 | Powell | 343/853 |
| 4,927,505 | 11/1990 | Isberg | 455/3 |

FOREIGN PATENT DOCUMENTS

| | | |
|---|---|---|
| 0181314 | 5/1986 | European Pat. Off. . |
| 0407226 | 1/1991 | European Pat. Off. . |
| 2659512 | 9/1991 | France . |
| 2645057 | 4/1978 | Germany . |

*Primary Examiner*—Curtis Kuntz
*Assistant Examiner*—Chi Pham

[57] ABSTRACT

A distributed antenna system is provided which is formed from a series of modular stages interconnected by cables. Each stage may include an antenna, a filter, a compensating amplifier and preferably elements for impedance matching to connecting cables. Connecting stages also include a coupler for combining the output from the stage antenna with the output from the preceding stage and passing the combined signal to the stage output. Where the stages are part of a transmitting system, the coupler is replaced by or functions as a splitter, an input thereto from, for example, a preceding stage, being applied to the stage antenna and to the stage output.

20 Claims, 4 Drawing Sheets

MODULAR DISTRIBUTED ANTENNA SYSTEM

This application is a continuation of application Ser. No. 07/662,278, filed Feb. 28, 1991, now abandoned.

FIELD OF INVENTION

The present invention relates to distributed antenna systems.

BACKGROUND OF INVENTION

Transmission and reception of broadcast radio frequency signals within a structure, such as a building or a tunnel, is often a desirable feature in such apparatus as mobile communications gear and mobile medical monitors. However, a well known problem with using such apparatus within a structure is that the structure itself can interfere with proper reception by an intended receiver. Properties of a structure which cause this interference can include reflection, absorption and shielding of radio signals by the materials which compose the bulk of the structure. Equipment designers have therefore proposed apparatus for distributing reception or transmission equipment throughout a structure, so that the effects of these properties are lessened, using, for example, "leaky feeder", parallel feed and serial feed distributed antenna systems.

A "leaky feeder" system is a transmission system utilizing a coaxial feeder cable having strategically placed holes in the shielding of the cable, whereby some radio frequency energy injected into one end of the cable by a transmitter may "leak out", and thus be broadcast. A receiver may also be configured to use a "leaky feeder" antenna system. However, such a cable typically has large losses which can degrade signal/noise ratio by reducing signal amplitude in the presence of noise sources. Amplification can be used to restore acceptable signal levels, but signal/noise ratio remains poor, since noise at an amplifier input is boosted along with signal at the input. In fact, an amplifier typically injects additional noise into the network. Furthermore, this type of system typically has a signal/noise ratio which varies greatly with distance along the cable, producing variable performance in different parts of a given installation. High power levels used to obtain reasonable signal levels, the poor signal/noise ratio, and the signal/noise ratio variations make such a system costly and limit the usable length of the system.

Both serial feed and parallel feed distributed antenna networks share with the "leaky feeder" system the problem of losses in the feeder cables. In each of these approaches, a number of discrete antenna elements are placed at intervals, along, for example, a tunnel or building hallway. The elements are connected to a transmitter or receiver apparatus by either a feeder cable which connects each antenna to the next in a series connection, or parallel feeder cables, which each run the entire length from an antenna to the apparatus. Serial and parallel networks may be combined to form a tree topology. Parallel networks and tree topologies require many components in practical implementations of complete networks. This leads to high initial, installation and maintenance costs.

A further problem inherent in distributed antenna networks of the prior art is a lack of flexibility. For example, in an application in a hospital involving mobile medical monitors, changing facility use patterns may necessitate changes to the antenna network. For example, if patients wearing mobile monitors were previously allowed to walk around one area and that area is then relocated or extended to include a different hall or ward, the new hall or ward must be equipped with receiving antennas. Parallel networks and tree topologies would necessitate a different configuration, leading to increased cost and/or complexity. Increased complexity may lead to higher design, recalibration or installation effort to optimize performance. In particular, lack of flexibility substantially complicates the initial design of such antenna systems.

Therefore, it is an object of the present invention to provide a flexible distributed antenna system having a plurality of discrete antennas locatable, for example, within a structure such as a building which may be reconfigured easily, without necessitating recalibration, redesign, or extensive installation effort.

Another object of this invention is to provide a distributed antenna system having a high signal/noise ratio.

A further object of this invention is to provide such an antenna system which requires fewer components than prior art systems.

Yet another object of the present invention is to provide a distributed antenna system having feed network signal/noise ratio and gain essentially independent of which antenna within the system is considered.

SUMMARY OF INVENTION

The foregoing and other objects are achieved in a distributed antenna system composed of compact stages, connected in series by cables. In a system according to the present invention, the elements of each stage are in close electrical proximity, relative to the length of the connecting cables. Thus, each stage may be constructed as a discrete module which is placed at a location where an antenna is desired.

The terminal stage at a remote end of a series typically includes an antenna, a filter and an amplifier circuit. This stage has an output which may be impedance-matched to an associated cable. Subsequent stages typically include an antenna, a filter, an input circuit, an amplifier circuit, a coupler for coupling both the antenna associated with a stage and a signal received at the input circuit into the amplifier circuit, and an output circuit. The input and output circuits of each of these stages may be impedance-matched to an associated cable. The terminal stage may, for example, be a special stage constructed for that purpose having only the essential elements, or may be similar to the subsequent stages and having the input properly terminated.

A series of stages, connected by cables yields a system with well-controlled characteristics. Fixing the amplifier gains, amplifier noise, cable losses and impedance, results in controlled signal/noise ratio and system loss,while allowing great flexibility. In particular, selecting the amplifier gains and/or the losses in one or more of the cables and other components of the system such that there are substantially equal network gains for any of the antennas minimizes signal/noise ratio deterioration, while providing uniform gain and signal/noise ratio throughout the system.

The invention will be more fully understood from the following description, which should be read in conjunction with the accompanying drawings, in which like numerals identify like elements.

DETAILED DESCRIPTION

Figure 1:
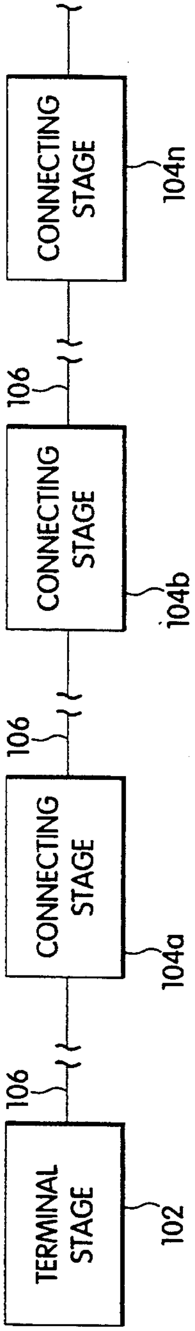
FIG. 1 is a block diagram of the present invention, illustrating the series connection of the stages.

Referring first to FIG. 1, the basic topology of the present invention is illustrated. This topology is a series connection of stages. Beginning at a remote end of the system there is a terminal stage 102 followed by at least one connecting stage 104*a*–104*n*. These stages are connected in series by cables 106. In a system according to the present invention, the cables 106, which may be of any type, including shielded or unshielded, have known characteristic impedances and losses. For purposes of illustration of this preferred embodiment, the losses will be assumed to be equal for all cables 106, and are represented by the attenuation factor $L_{CABLE}$; however, as will be seen, this is not a limitation of the invention, since the gain and/or losses of any stage may be set in accordance with this invention utilizing any known or determined cable loss. It may also be possible to include variations in cable loss in achieving the invention objectives.

Figure 2:
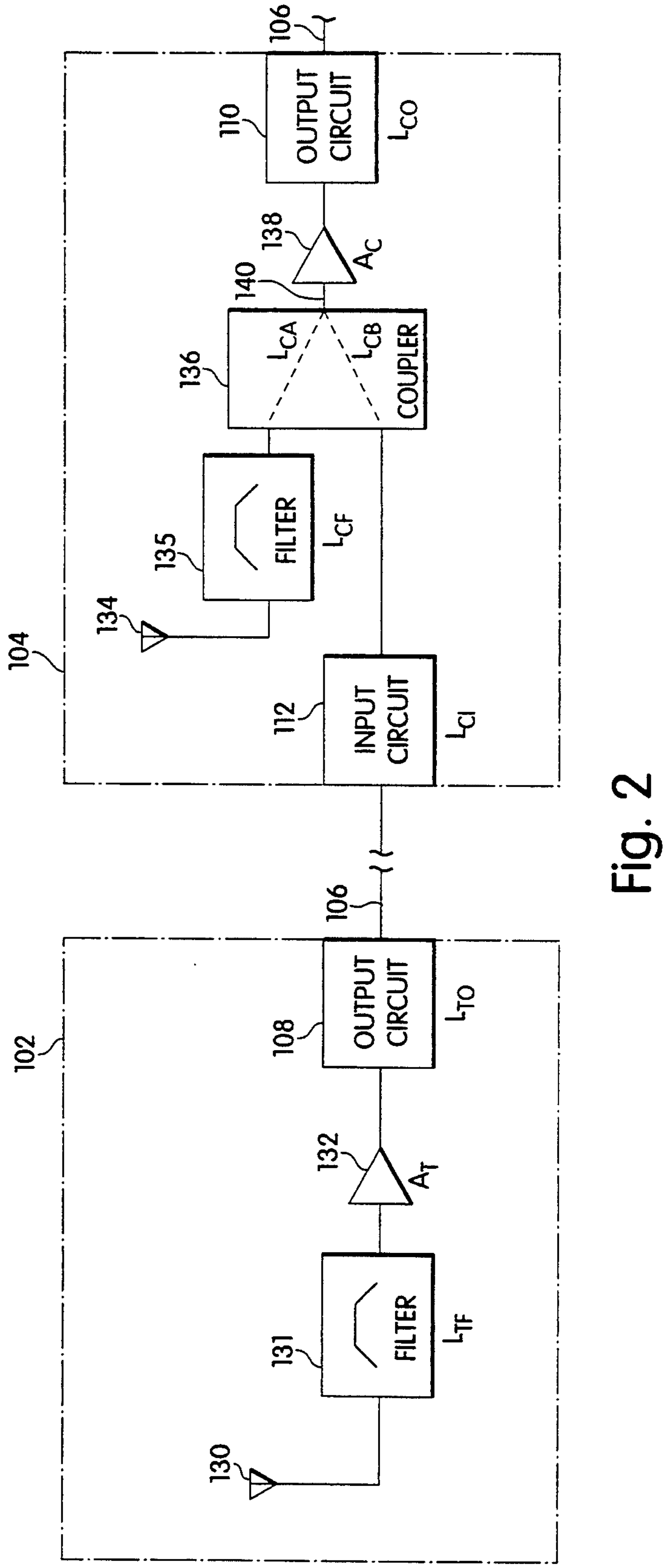
FIG. 2 is a detailed block diagram showing the elements of the stages, as well as the interconnection of the stages.

FIG. 2, is a more detailed diagram of a single terminal stage 102 and a single connecting stage 104 shown in FIG. 1. The elements within each stage are in close physical proximity to each other, relative to the length of the cables 106. For example, in a system involving mobile medical monitors, the elements within a stage may occupy about 1 cu. ft., while the cables 106 maybe about 70–100 ft. long. These dimensions are consistent with the requirements for a system operating at frequencies between 450 MHz and 470 MHz within the confines of a building, such as a hospital.

Figure 4:
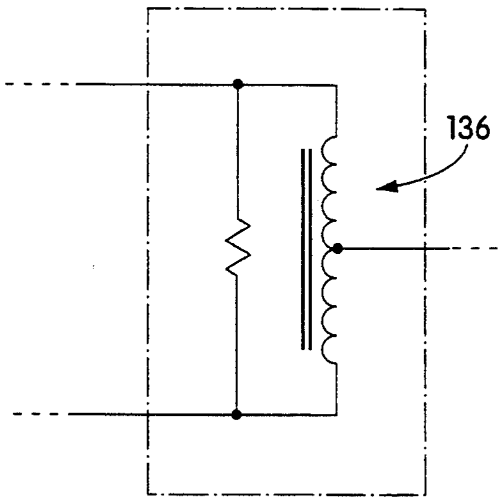
FIG. 4 is a schematic representation showing a balanced coupler of the magic T type.
Figure 5:
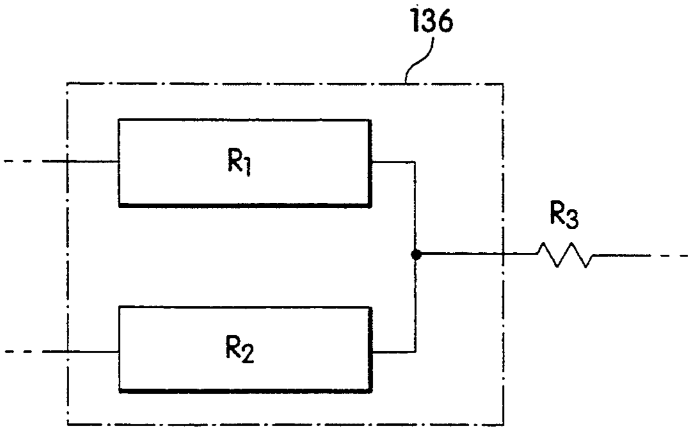
FIG. 5 is a schematic representation of a resistive summing coupler.

Terminal stage 102 includes an output circuit 108 impedance matched to the cable 106 axed having an attenuation factor $L_{TO}$. In addition, terminal stage 102, contains an antenna 130, a filter 131 having an attenuation factor $L_{TF}$ and an amplifier 132 having gain $A_T$. Similarly, each connecting stage 104 has an output circuit 110, impedance matched to the cable 106, and having an attenuation factor $L_{CO}$. Additionally, connecting stages 104, each have an input circuit 112, impedance matched to the cable 106, and having an attenuation factor $L_{CI}$. Each connecting stage 104 further contains an antenna 134, a filter 135 having an attenuation factor $L_{CF}$, a coupler 136, and an amplifier 138 having a gain of $A_C$. The coupler 136 attenuates the filtered antenna signal by a factor $L_{CA}$ and attenuates the input signal by a factor $L_{CB}$. Coupler 136 may, for example, be a standard magic T coupler as shown in FIG. 4, which is a "loss-less" type coupler resulting in low values for $L_{CA}$ and $L_{CB}$. A resistive standard coupler as shown in FIG. 5 may also be utilized. If coupler 136 is implemented as a magic T, then $L_{CA}$ and $L_{CB}$ will generally be substantially equal. However, while it is generally desirable to minimize the coupler losses, since the input from the stage antenna is uncompensated while the input from the preceding stage is compensated by the amplifier in such preceding stage, it is particularly desirable that $L_{CA}$ be minimized. Signals received by antenna 134 and input circuit 112 are combined into a single signal on line 140 by coupler 136. The single signal on line 140 is then amplified by amplifier 138.

The gain $A_T$ of amplifier 132 is selected such that the overall loss from the antenna 130 in the terminal stage 102 through the coupler 136 in the immediately subsequent connecting stage 104 is matched to the loss from the antenna 134 in the connecting stage 104 through the same coupler 136. Thus, a gain $A_T$ must be found which satisfies equation (1).

$$\frac{1}{L_{TF}} \times A_T \times \frac{1}{L_{TO}} \times \frac{1}{L_{CABLE}} \times \frac{1}{L_{CI}} \times \frac{1}{L_{CB}} = \frac{1}{L_{CF}} \times \frac{1}{L_{CA}} \quad (1)$$

In a similar manner, the gain $A_C$ of the amplifier 138 of each connecting stage 104 is selected such that for a stage, for example, stage 104*a*, the overall loss from the antenna 134 of that stage through the coupler 136 of the immediately succeeding stage, for example, stage 104*b*, matches the overall loss from the antenna 134 of that immediately succeeding connecting stage through the coupler 136 of that immediately succeeding stage. Thus, gain $A_{Ca}$ must satisfy Equation (2), wherein stages 104*a* and 104*b* are distinguished by lower case subscripts a and b appended to the loss terms.

$$\frac{1}{L_{CFa}} \times \frac{1}{L_{CAa}} \times A_{Ca} \times \frac{1}{L_{COa}} \times \frac{1}{L_{CABLE}} \times \frac{1}{L_{CIb}} \times \frac{1}{L_{CBb}} = \frac{1}{L_{CFb}} \times \frac{1}{L_{CAb}} \quad (2)$$

If stages 104*a* and 104*b* have identical losses $L_{CI}$, $L_{CO}$, $L_{CA}$, $L_{CB}$ and $L_{CF}$, then Equation (2) may be simplified to Equation (3).

$$A_C \times \frac{1}{L_{CO}} \times \frac{1}{L_{CABLE}} \times \frac{1}{L_{CI}} \times \frac{1}{L_{CB}} = 1 \quad (3)$$

The condition with substantially equal losses for all stages illustration by Equation (3) is the condition for the preferred embodiment. For this embodiment, the cable loss $L_{CABLE}$ for all cables 106 are also selected to be substantially equal. Under these conditions, as illustrated by Equation (3), the gain of each stage is substantially unity, and standardized stages may be utilized.

Although the preferred embodiment uses cables having equal losses, the invention may be practiced using cables of varying losses. In that event, Equations (1), (2) are used to find the gains $A_T$ and $A_C$ for each stage and its associated cable. Thus, an appropriate amplifier gain is found for each stage, which correctly compensates for $L_{CABLE}$ of the stage's associated cable. As illustrated by Equations (1)–(3), amplifier gain may also be adjusted to compensate for the other losses in a stage.

While in the discussion above, it has been assumed that amplifier gain is adjusted to compensate for cable and component losses associated with a stage, any of the losses shown in the Equations may be varied, either in addition to or instead of amplifier gain, in the design or implementation of the system to achieve the equalifies of the appropriate Equations (1)–(3).

A large distributed system containing many connecting stages 104 maintains a constant gain relative to each antenna 130 and 134, which gain is determined by other system tradeoffs. Also, loss and signal/noise ratio are well-controlled. The amplifiers 132 and 138 should be of a low-noise type to maximize the signal/noise ratio of each stage. Furthermore, the losses in filters 131 and 135 and the loss $L_{CA}$ of the couplers 136 should be minimized to achieve maximum signal/noise ratio.

A significant benefit of the present invention, as illustrated by the preferred embodiment, is the flexibility of the system. Since each stage and cable in such a system is standardized, replacement of a stage, or a change to the configuration requires no redesign, calibration or adjustment. The gain of the system from any antenna to a last stage is known to be substantially invariant with the number of stages. In practice, tolerances will determine the degree of invariance, which may increase if the number of stages becomes excessive.

Figure 3:
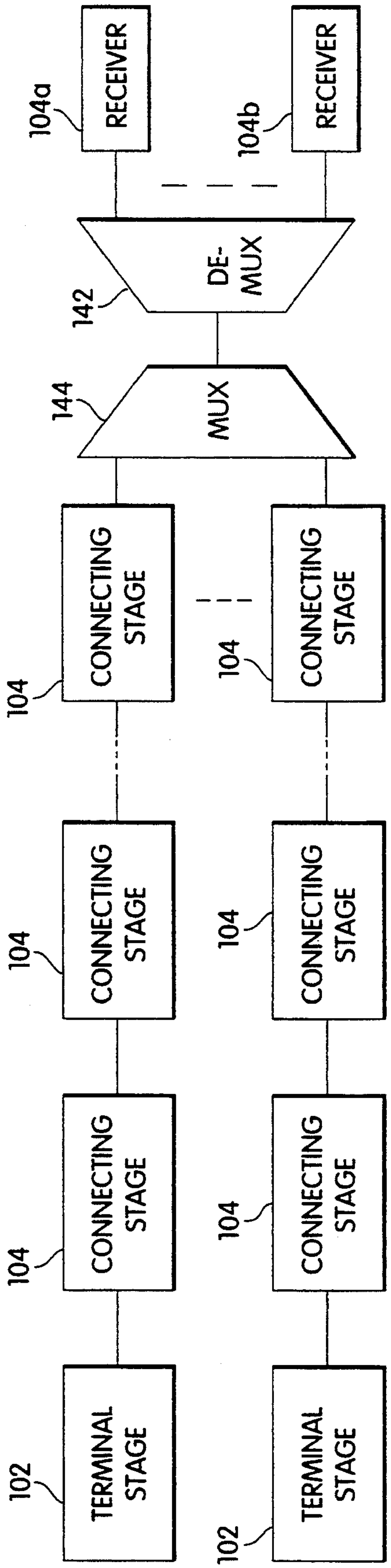
FIG. 3 is a block diagram illustrating an alternate configuration of the present invention showing multiple, series-connected stages, as well as multiple receivers.

While for the preferred embodiment shown in FIG. 1, all antennas in the system are connected in a single chain, as shown, for a simple example, in FIG. 3, two or more such series chains could be formed in parallel, for example in different halls, leading to a power combiner 144. Further, a distributed antenna system as described above may be configured to feed a power splitter 142 which further feeds a plurality of tuned receivers 140*a*–140*n*. Thus, multiple transmitters, operating at a plurality of different carrier frequencies within a band, and mobile within an enclosed site may all communicate simultaneously with the receiving equipment.

The systems described may be operated using a choice of power supply for the amplifiers. Each amplifier may be powered locally, either from a battery or distributed AC power, such as is normally found in modern buildings, or the amplifiers may be powered remotely, from power transmitted down the signal or other cables. In the latter configuration, a single, DC power supply may be located at any centrally convenient point in the system. When configured thus, the amplifier would preferably be AC coupled to the signal lines, and include a DC bypass for routing the DC power around the amplifier.

Figure 6:
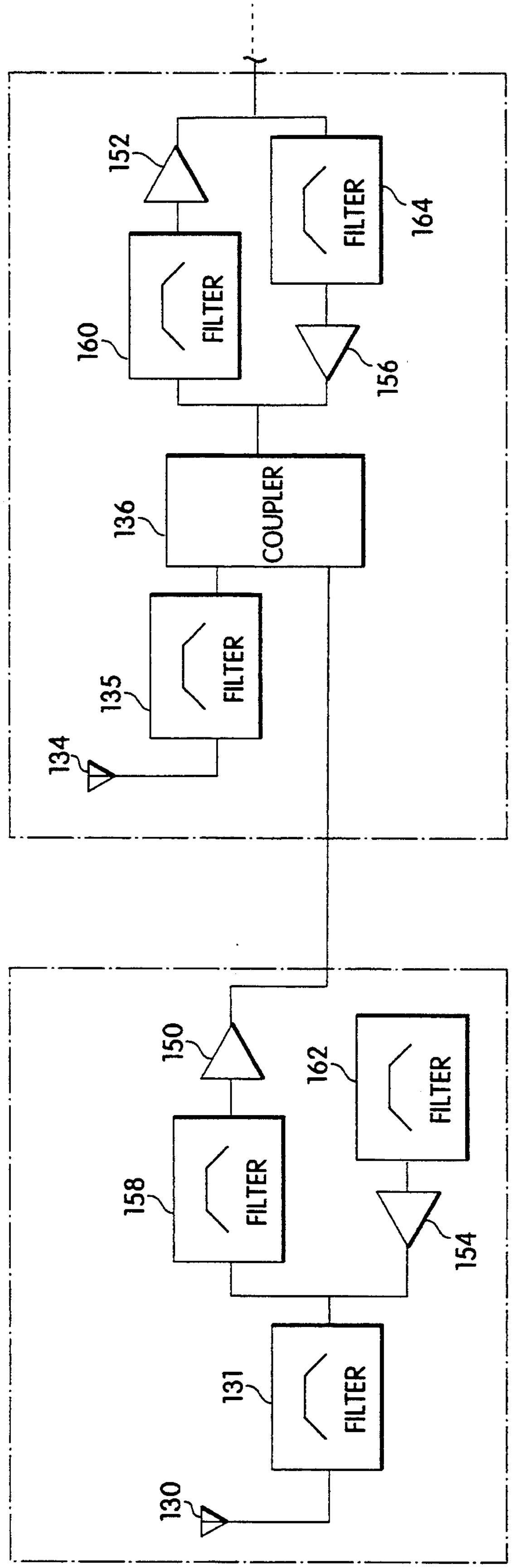
FIG. 6 is a detailed block diagram, similar to FIG. 2, showing the elements of an alternate embodiment employing bi-directional stages.

Other embodiments of this invention may be useful for transmission only or for bi-directional communications, as shown in FIG. 6. In this embodiment, the unidirectional amplifiers 132 and 138 of FIG. 2 are replaced with a frequency-division, bi-directional arrangement. In that arrangement, amplifiers 150 and 152 carry signals from the antennas 130 and 134. Those signals, which are the received signals, are disposed, for example, in the lower portion of an operating frequency band. Simultaneously, amplifiers 154 and 156 carry signals toward the antennas 130 and 134. The transmitted signals may, for example, be disposed in the upper portion of an operating frequency band. Filters 158 and 160 ensure that only frequencies in the receive portion of the band are carried by amplifiers 150 and 152, while filters 162 and 164 ensure that only frequencies in the transmit portion of the band are carried by amplifiers 154 and 156. Thus, with the amplifiers for transmit and receive operating in different frequency ranges, feedback loop within a stage is minimized, and the system may be operated in both the transmit and receive directions simultaneously.

Having thus described the inventive concept, an embodiment of the invention, and some modifications thereof, various other modifications, alterations and improvements will readily occur to those skilled in the art. Such modifications, alterations and improvements are intended to be suggested, though not expressly discussed, as the forgoing detailed description is offered by way of example only and is not intended to be limiting. The invention is limited only by the following claims and equivalents thereto.

What we claim is:

1. A distributed antenna system comprising:

at least two antennas for receiving broadcast signals; and a separate compensating amplifier means corresponding to each of the least two antennas and connected to receive a signal related to an output from the corresponding antenna;

at least selected ones of said at least two antennas and said compensating amplifier means being arranged to form at least one connecting stage, each said connecting stage including one of said at least two antennas, the amplifier means corresponding to said one of said at least two antennas, input means for receiving as an input signal an output of an amplifier means other than the amplifying means for said stage, means for coupling broadcast signals received by said antenna with said input signal received by said input means, a combined signal appearing at the coupling means output, said amplifier means for said stage amplifying said combined signal, and output means for outputting the amplified signal, the elements included in said connecting stage located in close proximity to each other.

2. A distributed antenna system as in claim 1, further comprising:

a terminal stage including in close proximity another of said at least two antennas, the separate compensating amplifier means corresponding to the another of the at least two antennas for amplifying a signal received by said another antenna, and means for providing said amplified signal as an output; and a cable connecting the output from said terminal stage to the input means of a first of the at least one connecting stage.

3. A distributed antenna system as in claim 2, wherein there is a first gain for a circuit extending from the antenna of said terminal stage through the coupling means of the at least one connecting stage and a second gain for a circuit extending from the antenna of the at least one connecting stage through the coupling means of the at least one connecting stage, and wherein said first and second gains are substantially equal.

4. A distributed antenna system as in claim 1, wherein there are a plurality of said connecting stages; and including cable means for connecting the output means of each stage to the input means of a succeeding stage, wherein said stages are series connected.

5. A distributed antenna system as in claim 4, wherein, for each connecting stage, said input means has an attenuation factor of $L_I$;

said amplifying means has a gain of A;

said output means has an attenuation factor of $L_O$;

said coupling means attenuates said broadcast signals by a factor $L_{CA}$ and attenuates said input signal received by a factor $L_{CB}$, wherein the cable means has an attenuation factor $L_{CABLE}$; and wherein:

$$\frac{1}{L_I} \times \frac{1}{L_{CB}} \times A \times \frac{1}{L_O} \times \frac{1}{L_{CABLE}} = 1$$

6. A distributed antenna system as in claim 5, wherein $L_{CA}$ and $L_{CB}$ are substantially equal.

7. A distributed antenna system as in claim 5, wherein $L_{CA}$ is substantially minimized.

8. A distributed antenna system as in claim 4, wherein there is a gain for each of said stages, which gains are substantially equal.

9. A distributed antenna system as in claim 8, wherein the gain for each stage is substantially unity.

10. A distributed antenna system as in claim 8, including a second series-connected plurality of connecting stages, one end of each series-connected plurality of connecting stages including an end stage, and means for combining outputs from an output means of the end stage of each series-connected plurality of connecting stages to produce a single combined output.

11. A distributed antenna system as in claim 10, including:

a plurality of receivers, and splitter means connected to receive and to distribute said single combined output to said plurality of receivers.

12. A distributed antenna system as in claim 1, wherein said output means includes a cable associated with said stage, and further wherein said system has a plurality of series connected connecting stages, and wherein said cable connects the output means from each stage to the input means of the succeeding stage.

13. A distributed antenna system as in claim 12, wherein said cable has a length of approximately 70–100 ft.

14. A distributed antenna system as in claim 13, wherein said antennas are tuned for broadband radio frequency reception including frequencies between 450 MHz and 470 MHz.

15. A distributed antenna system as in claim 12 wherein the impedance of each input means is substantially matched to the impedance of the cable connecting thereto.

16. A distributed antenna system as in claim 12 wherein the impedance of each output means is substantially matched to the impedance of the cable connecting thereto.

17. A distributed antenna system comprising:

at least two stages, each having an antenna connected to a coupler/splitter means, and a pair of input/output means connected to said coupler/splitter means, cable means interconnecting each two adjacent stages, wherein said stages are series connected to pass signals therebetween, the cable means being connected to the input/output means of each of the two adjacent stages; and separate amplifier means in each stage corresponding to each antenna to compensate for signal losses in the stage and in a cable connected thereto, the amplifier means connected between the coupler/splitter means and one of the pair of input/output means.

18. A distributed antenna system comprising:

means for generating a first signal, containing information corresponding to information in a received broadcast signal; and a plurality of connecting stages, each said connecting stage including input means for receiving an input signal, an antenna for receiving broadcast signals, means for coupling broadcast signals received by said antenna with the input signal received by said input means, a combined signal appearing at the coupling means output, means for amplifying said combined signal, and output means for outputting the amplified signal, the means for receiving the input signal of a first one of the plurality of connecting stages connected to receive the first signal, and the elements included in each said connecting stage located in close proximity to each other;

and further including cable means for connecting the output means of each stage to the input means of a succeeding stage, wherein said stages are series connected; and wherein, for each connecting stage, said input means has an attenuation factor of $L_I$;

said amplifying means has a gain of A;

said output means has an attenuation factor of $L_O$;

said coupling means attenuates said broadcast signals by a factor $L_{CA}$ and attenuates input signal received by a factor $L_{CB}$, wherein the cable means has an attenuation factor $L_{CABLE}$; and wherein $$\frac{1}{L_I} \times \frac{1}{L_{CB}} \times A \times \frac{1}{L_O} \times \frac{1}{L_{CABLE}} = 1.$$

19. A distributed antenna system as in claim 19 wherein $L_{CA}$ and $L_{CB}$ are substantially equal.

20. A distributed antenna system as in claim 18 wherein $L_{CA}$ is substantially minimized.

* * * * *